(12) United States Patent
Krishnamurthy et al.

(10) Patent No.: US 7,680,839 B1
(45) Date of Patent: Mar. 16, 2010

(54) SYSTEM AND METHOD FOR RESYNCHRONIZING MIRRORED VOLUMES

(75) Inventors: Raghu Krishnamurthy, Santa Clara, CA (US); Gopal Sharma, San Jose, CA (US); Amitava Guha, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1177 days.

(21) Appl. No.: 10/955,017

(22) Filed: Sep. 30, 2004

(51) Int. Cl.
*G06F 12/00* (2006.01)

(52) U.S. Cl. ........................ 707/204; 711/162

(58) Field of Classification Search ........... 707/200, 707/201, 202, 204; 709/212, 219; 711/161, 711/162; 714/4, 6, 7, 42
See application file for complete search history.

(56) References Cited

U.S. PATENT DOCUMENTS

| | | | | |
|---|---|---|---|---|
| 5,933,653 | A * | 8/1999 | Ofek | 710/6 |
| 6,131,148 | A * | 10/2000 | West et al. | 711/162 |
| 6,144,999 | A * | 11/2000 | Khalidi et al. | 709/219 |
| 6,163,856 | A * | 12/2000 | Dion et al. | 714/4 |
| 6,360,330 | B1 * | 3/2002 | Mutalik et al. | 714/4 |
| 6,401,215 | B1 * | 6/2002 | Maddalozzo et al. | 714/6 |
| 6,609,183 | B2 * | 8/2003 | Ohran | 711/161 |
| 6,611,923 | B1 * | 8/2003 | Mutalik et al. | 714/4 |
| 6,654,912 | B1 * | 11/2003 | Viswanathan et al. | 714/42 |
| 6,691,245 | B1 * | 2/2004 | DeKoning | 714/6 |
| 6,721,901 | B1 * | 4/2004 | McBrearty et al. | 714/6 |
| 6,799,189 | B2 * | 9/2004 | Huxoll | 707/204 |
| 6,826,580 | B2 * | 11/2004 | Harris et al. | 707/202 |
| 7,139,808 | B2 * | 11/2006 | Anderson et al. | 709/212 |
| 2003/0177323 | A1 * | 9/2003 | Popp et al. | 711/162 |
| 2003/0212920 | A1 * | 11/2003 | Fujibayashi | 714/7 |
| 2005/0154847 | A1 * | 7/2005 | Trembecki | 711/162 |

OTHER PUBLICATIONS

Wiebalck et al., "Fault-tolerant Distributed Mass Storage for LHC Computing," Proceedings of the 3rd IEEE/ACM International Symposium on Cluster Computing and the Grid, 2003, (8 pages).
"Network Appliance SnapMirror Software Brochure," NetworkAppliance, 2003, (2 Pages).

* cited by examiner

*Primary Examiner*—James Trujillo
*Assistant Examiner*—Hubert Cheung
(74) *Attorney, Agent, or Firm*—Robert C. Kowert; Meyertons, Hood, Kivlin, Kowert & Goetzel, P.C.

(57) ABSTRACT

System and method for resynchronizing mirrored volumes in a storage system. According to one embodiment, a system may include a first volume located at a primary site and associated with a first storage management device, and a second volume located at a secondary site and associated with a second storage management device, where the secondary site is coupled to the primary site via a data link, and where the second volume is configured as a mirror of the first volume. The first storage management device may be configured to convey to the second storage management device an indication of a data block written to the first volume subsequent to a failure of the data link. Dependent upon the indication, the second storage management device may be configured to create a snapshot of the data block as stored on the second volume prior to resynchronization of the data block.

24 Claims, 6 Drawing Sheets

SYSTEM AND METHOD FOR RESYNCHRONIZING MIRRORED VOLUMES

BACKGROUND

1. Field of the Invention

This invention relates to data storage and, more particularly, to techniques for resynchronizing mirrored volumes in storage systems.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

To provide for a degree of security against loss of critical data, for example due to hardware failure or a site-wide catastrophe such as a fire or natural disaster, copies of critical data may be stored at more than one site. For example, critical data may be stored on several volumes, where one volume is configured to mirror another. A mirror volume may be located at a different physical site from a volume at a primary site, which may provide a backup source of data in case of a failure at the primary site.

If a failure occurs during system operation, mirrored data volumes may not reflect the same data (i.e., may become inconsistent), for example if data is written to one mirrored volume but not another. In some cases, inconsistent mirrors may need to be resynchronized following a failure in order for applications to continue operating properly. However, resynchronization of mirrored volumes located at different sites may suffer from slow performance, for example if the communications path between sites is bandwidth-constrained.

SUMMARY

Various systems and methods for resynchronizing mirrored volumes in a storage system are disclosed. According to one embodiment, a system may include a first volume located at a primary site and associated with a first storage management device, and a second volume located at a secondary site and associated with a second storage management device, where the secondary site is coupled to the primary site via a data link, and where the second volume is configured as a mirror of the first volume. The first storage management device may be configured to convey to the second storage management device an indication of a data block written to the first volume subsequent to a failure of the data link. Dependent upon the indication, the second storage management device may be configured to create a snapshot of the data block as stored on the second volume prior to resynchronization of the data block.

In one specific implementation of the system, subsequent to creation of the snapshot, the first storage management device may be configured to resynchronize the data block, where resynchronizing the data block may include copying the data block from the first volume to the second volume.

A method is further contemplated, which in one embodiment may include associating a second volume located at a secondary site with a second storage management device, where the secondary site is coupled to the primary site via a data link, and where the second volume is configured as a mirror of a first volume located at a primary site and associated with a first storage management device. The method may further include conveying to the second storage management device an indication of a data block written to the first volume subsequent to a failure of the data link, and dependent upon the indication, creating a snapshot of the data block as stored on the second volume prior to resynchronization of the data block.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Storage System Architecture

Figure 1:
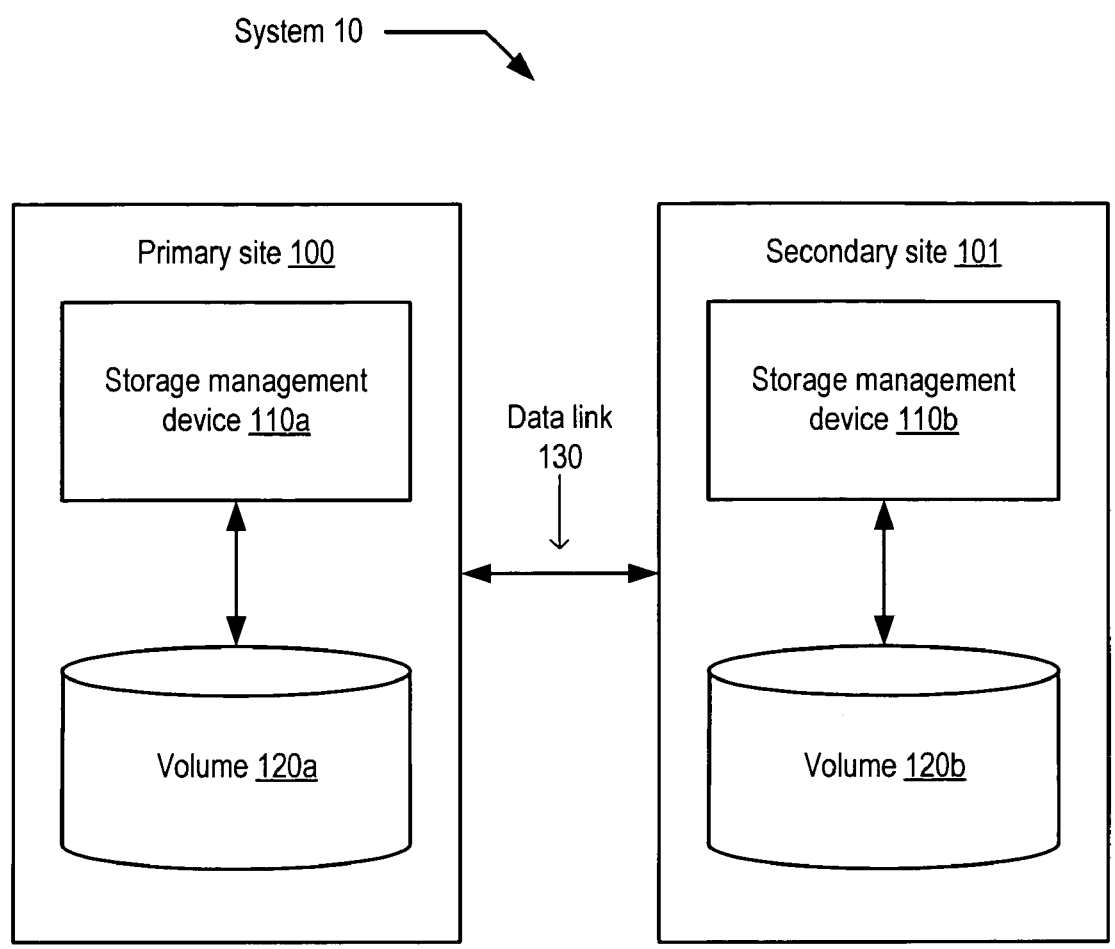
FIG. 1 is a block diagram illustrating one embodiment of a storage system.

FIG. 1 illustrates a storage system 10 according to one embodiment. In the illustrated embodiment, system 10 includes a primary site 100 coupled to a secondary site 101 via a data link 130. Primary site 100 and secondary site 101 respectively include storage management devices 110a-b. Storage management devices 110a-b are in turn associated with respective volumes 120a-b.

Volumes 120 may be configured for data storage. Specifically, in one embodiment, each of volumes 120 may comprise a block storage device that may be presented directly for use by a block device consumer or client, such as an application (e.g., a database application) or a file system. Generally speaking, a block storage device may comprise a hardware or software entity that provides a collection of linearly addressed data blocks that can be read or written. For example, in one embodiment a given volume 120 may include a single disk drive configured to present all of its sectors as an indexed array of blocks. It is contemplated that any suitable type of storage device may be configured as a block storage device and presented as a volume 120. For example, potential block storage devices include fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a given volume 120 may comprise more than one block device. For example, several different block devices (such as disks) each having their own respective block address spaces may be mapped into a single block address space corresponding to a given volume 120. Such a mapping may also be referred to as storage or block virtualization, or simply as virtualization.

In one embodiment, storage management devices 110 may be configured to manage access to associated volumes 120. For example, in some embodiments a plurality of volumes 120 may be associated with a particular storage management device 110, and that particular storage management device 110 may be configured to route requests for volume access (e.g., read/write requests originating from applications or other volume clients) to the appropriate volume 120. In some embodiments, storage management devices 110 may also participate in the configuration and control of associated volumes 120. For example, as described in greater detail below, in various embodiments a given storage management device 110 may comprise a storage area network (SAN) switch or a host computer configured to manage the virtualization of a given volume 120 (i.e., the mapping of given volume 120 to its constituent block devices). It is contemplated that in some embodiments, an application or other client of a volume 120 may be configured to execute directly on a storage management device 110, for example in an embodiment where storage management device 110 comprises a host computer. Alternatively, such a volume client may be configured to execute on a different computer system and to communicate with storage management device 110 via a network, such as an Ethernet network, another type of local area network (LAN), or a wide area network (WAN).

It is noted that in some embodiments, the association between a storage management device 110 and a given volume 120 may be transient and need not correspond to a particular physical connection. For example, in some embodiments a storage management device 110 in one location, such as primary site 100, may be associated with a volume 120 in another location, such as secondary site 101. In some embodiments the association between storage management devices 110 and volumes 120 may be managed by a volume manager as described in greater detail below. For example, in some embodiments a storage management device 110 may be associated with a particular volume 120 by instructing a volume manager to perform a mount operation or a similar volume configuration operation.

Data stored on a given volume, for example volume 120*a*, may be critical to the operation of one or more applications. For example, system 10 may be configured to provide storage for various enterprise functions, such as electronic commerce, inventory management, production control, customer contact and support information, or other functions for which data loss might create a substantial disruption to the enterprise. Thus, in one embodiment, system 10 may be configured for disaster recovery capability in which volume 120*b* is configured as a mirror of volume 120*a*. That is, in one embodiment, upon an application issuing a write to a particular data block, the data block may be written to both volumes 120*a-b*. Further, the write operation may not be reported to the issuing application as complete until the data block has been successfully written to both volumes 120*a-b*. Under normal operating conditions, volume 120*b* may represent a complete copy of the data blocks stored on volume 120*a* at a given point in time. (For read operations, only one of volumes 120*a-b* needs to be accessed, and in some embodiments the volume 120 that is topologically or physically closest to the requesting application may service the read.) It is noted that in some embodiments, an arbitrary number of volumes 120 may be configured as mirrors of a given volume 120. It is further noted that mirroring of volumes may also be referred to as synchronous replication of volumes, regardless of whether the mirrored volumes are local to the same site or located at different sites. Also, a given mirror volume, such as one of volumes 120*a-b*, may be referred to as a synchronous replica.

In the illustrated embodiment, volumes 120*a-b* and storage management devices 110*a-b* are implemented at two different sites, primary site 100 and secondary site 101, each connected to the other by data link 130. In some embodiments, primary site 100 and secondary site 101 may be physically separated sites at some distance from one another, such as two different facilities several kilometers apart. In such embodiments, the separation distance may depend on the signaling characteristics of the type of data link 130 used. For example, in one embodiment data link 130 may be compatible with the Fibre Channel specification, which may allow for link lengths of 8-10 kilometers or more. In other embodiments, different types of interfaces may be used for data link 130, which may allow for varying separation distances between storage management devices 110*a-b*.

To the extent that sites 100 and 101 are physically separated, the likelihood of successfully performing disaster recovery may be enhanced, since a catastrophe that occurs at primary site 100 (such as a fire or flood) may not affect the integrity of the data at secondary site 101. However, it is contemplated that in some embodiments, primary site 100 and secondary site 101 may be located within the same facility or the same room. In some embodiments storage management devices 110*a-b* (and thus sites 100 and 101) may be physically adjacent to one another, for example in the same server rack.

Figure 2:
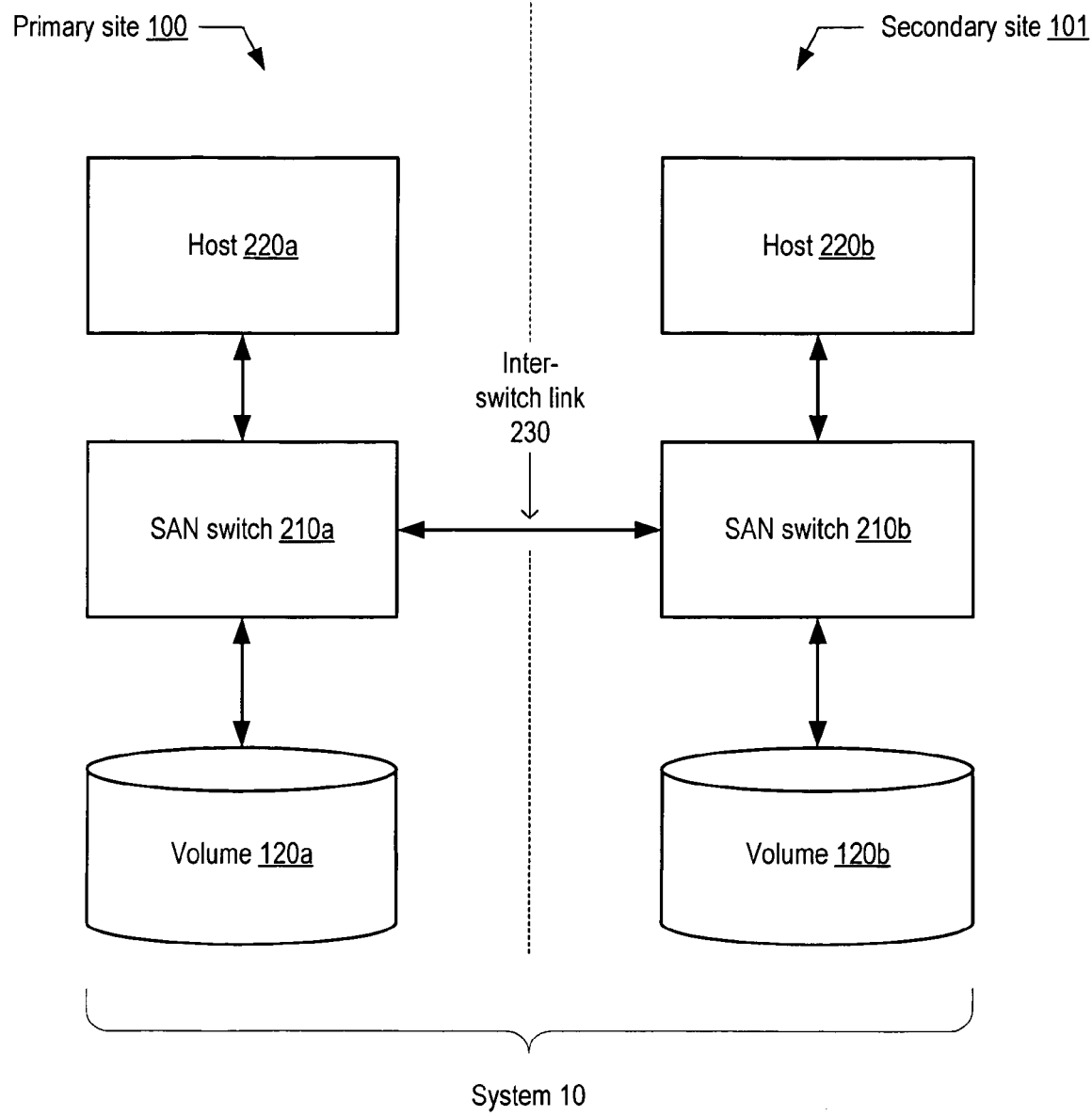
FIG. 2 is a block diagram illustrating an embodiment of a storage system including different types of storage management devices.

As noted above, in various embodiments a given storage management device 110 may be implemented in different ways, such as via a host or a SAN switch. The embodiment of system 10 illustrated in FIG. 2 shows one possible arrangement of such devices. In the illustrated embodiment, primary site 100 comprises host 220*a* coupled to SAN switch 210*a*, and secondary site 101 comprises host 220*b* coupled to SAN switch 210*b*. Volumes 120*a-b* are coupled to respective SAN switches 210*a-b*, which in turn are coupled to each other via inter-switch link (ISL) 230.

In one embodiment, hosts 220 may be configured as general-purpose computer systems capable of executing one or more operating systems, applications, or other types of software. In some such embodiments, either or both of hosts 220 may be configured to run a version of software, also referred to as a volume manager, configured to manage associations between hosts 220 and volumes 120 and to perform volume management functions for an associated volume 120. For example, hosts 220 may be configured to execute a version of VERITAS Cluster Volume Manager (CVM), VERITAS SAN Volume Manager (SANVM), or another suitable volume management product. Generally speaking, a volume manager may be configured to configure and coordinate access to one or more volumes 120 under management. For example, in one embodiment a volume manager may be configured to coordinate storage virtualization features mentioned above. Also, in one embodiment a volume manager may be configured to manage and coordinate the mirroring of volumes 120*a-b*. That is, such a volume manager may be aware of the existence and configuration of volume 120*b* as a mirror of volume 120*a*, may coordinate block write traffic received from volume clients such that writes are issued to both volumes 120*a-b*, and may report writes to requesting clients as complete only when the corresponding blocks have been successfully written to each of volumes 120*a-b*. An embodiment of host 220 configured to perform volume management functions may be illustrative of storage management devices 110 of FIG. 1.

SAN switches 210a-b may be configured to provide high-bandwidth connectivity between hosts 220 and volumes 120. For example, in some embodiments primary site 100 or secondary site 101 may include a plurality of hosts 220 and a plurality of volumes 120, and multiple different hosts 220 may be configured to access multiple different volumes 120. Rather than directly coupling each such host 220 to each desired volume 120, a SAN switch 210 may be interposed between hosts 220 and volumes 120. In some embodiments, SAN switches 210 may include a plurality of ports and may be configured to route a request received at any given port to any other port. Thus, for example, hosts 220 and volumes 120 may be connected to ports of a SAN switch 210, which may then serve to exchange traffic among hosts 220 and volumes 120 in a crossbar-like fashion. In some embodiments, in addition to performing one-to-one communication among ports, SAN switches 210 may be configured to perform many-to-one communication, thus enabling multicast and broadcast-type communication between volumes 120 and hosts 220. In one embodiment, SAN switch 210 may be configured to employ a Fibre Channel interconnect between volumes 120 and hosts 220, although in other embodiments, any suitable interconnect may be used. For example, it is contemplated that a SAN may be implemented over other types of interconnect, such as a switched Internet Protocol (IP) network implemented over a version of Ethernet (e.g., 10-gigabit Ethernet).

In the illustrated embodiment, SAN switches 210a-b are coupled via ISL 230, which may be illustrative of data link 130 of FIG. 1. In some embodiments, ISL 230 may be of a type similar to the links used between SAN switches 210, volumes 120 and hosts 220, e.g., a Fibre Channel link. In the illustrated embodiment, ISL 230 may be configured to allow a host 220 or SAN switch 210 located at one site to access a volume 120 located at another site.

In some embodiments, a host 220 may be configured to perform the functions of storage management device 110, as described above. In some such embodiments, the host's corresponding SAN switch 210 may be relatively passive with respect to volume management functions. That is, SAN switch 210 may be configured to convey traffic between such a host 220 and associated volumes 120, while host 220 actively manages the configuration and coordination of volumes 120. However, in other embodiments, to SAN switch 210 may include volume management capabilities. For example, in one embodiment, a SAN switch 210 may include hardware configured to execute an embedded volume manager that may perform functions similar to the host-based volume manager described above. Such an embodiment of SAN switch 210 may variously be referred to as an "intelligent" SAN switch or a virtualization SAN switch, and may be illustrative of storage management devices 110 of FIG. 1.

As an example, in one embodiment a virtualization SAN switch 210 may be configured to manage attached volumes 120 as mirrors independently of host 220. That is, SAN switch 210 may present an interface to mirrored storage to host 220. Host 220 may convey write requests to SAN switch 210, which may responsively coordinate among volumes 120 to ensure that the writes are committed to each mirror volume. Such coordination may occur transparently to host 220. Additionally, in some embodiments a virtualization SAN switch 210 may be configured to perform other volume management tasks, such as creating snapshots of volumes 120, implementing volume spanning and/or striping, or other types of storage virtualization.

In some embodiments, the function of storage management device 110 may be realized by either host 220 or SAN switch 210, as described above, and may be transparent to the other device. That is, in some embodiments a host 220 may implement volume management functions while a SAN switch 210 is relatively passive with respect to those functions, while in other embodiments, a SAN switch 210 may be configured to actively manage volumes 120 in a manner transparent to a host 220. It is contemplated that in other embodiments, the function of storage management device 110 may be realized by both host 220 and SAN switch 210. That is, in some embodiments multiple layers of virtualization volume management may be provided, with a host 220 providing some management and a SAN switch 210 providing additional management. Further, it is contemplated that the partitioning of storage management functionality among hosts 220 and SAN switches 210 may differ across different sites, such as primary site 100 and secondary site 101.

Failure Recovery

In embodiments where volume 120b is configured as a mirror of volume 120a, either host 220a or SAN switch 210a may be configured to convey block writes destined for volume 120a over ISL 230 to be written also to volume 120b. However, in some instances, a failure may occur after a block has been written to volume 120a, but before the block has been correspondingly written to volume 120b. For example, ISL 230 may fail due to a temporary disruption between primary site 100 and secondary site 101, or SAN switch 210b or volume 120b may experience a hardware failure. Generally speaking, any failure to write a data block to a corresponding mirror volume 120 may be referred to as a data link failure, irrespective of whether the write failure occurred due to a problem with ISL 230 or some point downstream from ISL 230.

In the event a data block is written to some but not all mirrored volumes 120, those volumes may be referred to as being in an inconsistent state or out of synchronization. In some cases, if an application were to attempt to read a data block from a set of inconsistent mirrored volumes 120, a different value may be returned depending on which of volumes 120 serviced the read (i.e., a volume 120 to which a write had occurred, or a volume 120 to which the write had not yet occurred prior to a data link failure). Consequently, in some embodiments, before further access is allowed to mirrored volumes 120 following a data link failure, volumes 120 may be resynchronized to eliminate the possibility of reading inconsistent values from volumes 120. For example, in one embodiment resynchronization may include either host 220a or SAN switch 210a copying to volume 120b a data block that had been written to volume 120a subsequent to the data link failure (e.g., after the data link is restored). In some embodiments, resynchronization may occur in response to a data link failure being resolved, for example by the failed element of the data link being restored or an alternative data link established.

However, in some instances, a failure at primary site 100 may occur during volume resynchronization. For example, one or more of host 220a, SAN switch 210a, or volume 120a could fail before resynchronization completes, due to an isolated problem or a site-wide catastrophe. In some embodiments, such a failure occurring during resynchronization may result in volume 120b being only partly resynchronized. That is, only some of the data blocks written to volume 120a subsequent to the original data link failure may have been copied to volume 120b at the time resynchronization failed.

Following a catastrophic failure at primary site 100, in some embodiments system 10 may be configured to attempt to bring up at secondary site 101 one or more applications that require access to data stored on the mirrored volumes 120. Specifically, applications may be brought up at secondary site 101 and directed to volume 120b. However, if a failure occurred during resynchronization of volume 120b after a data link failure, volume 120b may be in a transactionally inconsistent state with respect to one or more applications. That is, an application may expect that certain writes it generates to multiple data blocks will be committed in a transactional fashion (i.e., all blocks will be written, or none will be written). If, due to a resynchronization failure, some but not all blocks written to volume 120a have been copied to volume 120b, an application may not be able to correctly proceed when brought up at secondary site 101.

To prevent such transactional inconsistency from occurring, in some embodiments, a snapshot or image of a data block stored on volume 120b is created prior to resynchronization of that data block. That is, in some embodiments, the value of a data block stored on volume 120b is copied, for example to another block location within volume 120b or to a different volume 120 mounted at secondary site 101. This copying may occur before the data block on volume 120b is overwritten as a result of copying a corresponding block (reflecting a write subsequent to the original data link failure) from volume 120a. By creating a snapshot of data blocks on volume 120b before resynchronization of those data blocks occurs, it may be possible to "roll back" volume 120b to its state before resynchronization began, should a failure occur while resynchronization is in progress. For example, in response to such a failure occurring, in some embodiments host 220b or SAN switch 210b may be configured to restore the data blocks that had already been resynchronized (or, alternatively, all data blocks of volume 120b subject to resynchronization, whether actually resynchronized or not) from the previously created snapshot of those data blocks. In the context of resynchronization of a mirror volume, this snapshot may also be referred to as a "rollback snapshot."

In some embodiments, creation of the rollback snapshot of volume 120b may be coordinated from primary site 100. For example, host 220a or SAN switch 210a may be configured to issue read and write operations to volume 120b in order to create a snapshot of the blocks about to be resynchronized. However, depending on the configuration of system 10, the number of blocks requiring resynchronization after a data link failure may be substantial. For example, in some embodiments the bandwidth of ISL 230 may decrease and/or its latency may increase as the link length increases, which may result in the communications path from host 220a to volume 120a being considerably faster than the path from host 220a to volume 120b. Therefore, in some instances a large number of blocks may be written to volume 120a before a data link failure and a consequent need for resynchronization may be detected. Creating a snapshot of and then resynchronizing each of these blocks of volume 120b under the control of primary site 100 may require three traversals of ISL 230: the data block may be read from volume 120b by host 220a or SAN switch 210a, then written back to volume 120b (or another volume at secondary site 101) to create the block snapshot. Then, the data block may be copied from volume 120a to volume 120b to effect the resynchronization. In this scenario, two-thirds of the relatively limited bandwidth of ISL 230 used during the resynchronization process is used in creating the rollback snapshot.

In embodiments where ISL 230 is a limited resource within system 10, unnecessary utilization of ISL 230 may result in overall performance degradation of system 10 under certain circumstances, such as the resynchronization scenario just described. In such embodiments, ISL 230 may be said to be relatively costly in comparison to other resources (such as other communications paths) within system 10. In one embodiment, utilization of ISL 230 may be reduced (and performance of system 10 potentially increased) by delegating creation of the rollback snapshot to a storage management device at secondary site 101.

Specifically, in one embodiment a storage management device at primary site 100 (e.g., host 220a or SAN switch 210a) may be configured to convey an indication of one or more data blocks written to volume 120a subsequent to a data link failure to a storage management device at secondary site 101 (e.g., host 220a or SAN switch 210a). For example, a volume manager running on either host 220a or SAN switch 210a may be configured to track those block writes that have occurred on volume 120a, such as by using a bitmap to record written or "dirty" blocks, or by using a write log to record additional information about dirty blocks, such as the value written to the block, the time the write occurred, etc. In some embodiments, dirty blocks may not be tracked individually. Instead, regions of volume 120a including multiple data blocks may be identified as dirty if any block within the region is written to.

Subsequent to a data link failure, host 220a or SAN switch 210a may be configured to identify those blocks of volume 120a in need of resynchronization, using any suitable means of tracking dirty blocks. In one embodiment, an indication of those blocks, such as a bitmap, a list of block numbers, or another suitable indication may then be sent to secondary site 101, for example via ISL 230. Dependent upon the indication received, a storage management device at secondary site 101 (e.g., host 220b or SAN switch 210b) may be configured to create a snapshot of the indicated dirty blocks as stored on volume 120b prior to resynchronizing the dirty blocks. (In some embodiments where regions rather than individual blocks are tracked as dirty, it is possible that some unwritten or "clean" blocks within the region may have snapshots created and may be resynchronized along with the dirty blocks within the region.)

Any suitable technique for creating a snapshot of the blocks to be resynchronized may be employed. In one embodiment, host 220b or SAN switch 210b may be configured to allocate snapshot storage (either on volume 120b or on another volume located at or near secondary site 101) and may complete creating a snapshot of the blocks to be resynchronized before resynchronization begins. That is, prior to resynchronization, in one embodiment a complete snapshot of all blocks on volume 120b that are subject to resynchronization may be created before any blocks are resynchronized. In an alternative embodiment, host 220b or SAN switch 210b may be configured to allocate snapshot storage dependent upon the indication of blocks to be resynchronized that is received from primary site 100, but may not actually create a snapshot copy of a given block of volume 120b until that block is actually written during the resynchronization operation (e.g., when that block is copied from volume 120a to volume 120b). This snapshot behavior may also be referred to as a "copy-on-write" (COW) snapshot. In such an embodiment, resynchronization may begin sooner than in an embodiment where a snapshot is created of all blocks subject to resynchronization before resynchronization begins. However, resynchronizing each block may take additional time in a COW snapshot embodiment as compared to a non-COW embodiment, accounting for the additional snapshot overhead that may occur on each resynchronization block write.

Should a failure occur during resynchronization, for example due to a catastrophic failure at primary site 100, a storage management device at secondary site 101, such as host 220b or SAN switch 210b, may be configured to restore the data blocks subject to resynchronization to their pre-resynchronization values from the rollback snapshot. For example, in one embodiment host 220b or SAN switch 210b may know prior to resynchronization how many blocks will be resynchronized, and possibly their identities, from the indication conveyed from primary site 100. In such an embodiment, host 220b or SAN switch 210b may be configured to detect whether all indicated blocks were subsequently resynchronized. If not, a failure may have occurred. (A resynchronization failure may also be detected more directly, for example by a failure of devices at primary site 100 to respond to communication requests.) In response to a resynchronization failure, host 220b or SAN switch 210b may be configured to restore the blocks of volume 120b subject to resynchronization from the rollback snapshot, for example by copying those blocks from snapshot storage back to their original location on volume 120b. In some embodiments, all blocks may be restored from the rollback snapshot, while in other embodiments, only those blocks already resynchronized may be restored from the rollback snapshot.

By delegating creation of the rollback snapshot to a storage management device at secondary site 101, in one embodiment only an indication of the data blocks of volume 120a to be resynchronized followed by the values of those data blocks need be conveyed via ISL 230, which may conserve the limited resources of ISL 230 relative to an embodiment in which rollback snapshot creation is performed from a storage management device at primary site 100.

Figure 3:
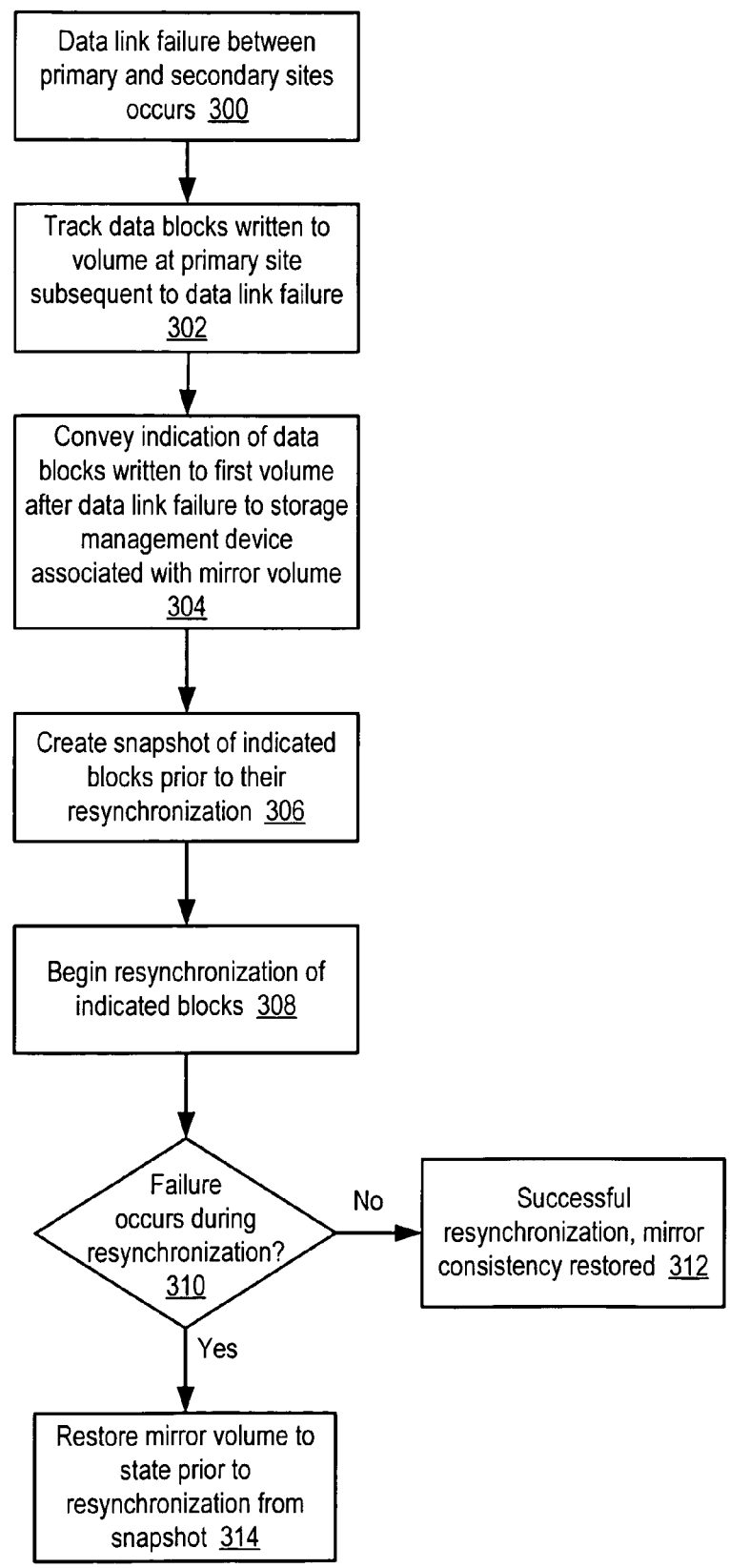
FIG. 3 is a flow diagram illustrating one embodiment of a method of data block resynchronization.

One embodiment of a method of data block resynchronization is illustrated in FIG. 3. Referring collectively to FIG. 1 through FIG. 3, operation begins in block 300 where a data link failure between primary site 100 and secondary site 101 occurs. Subsequent to the data link failure, data blocks written to volume 120a at primary site 100 are tracked, for example via a bitmap or log (block 302).

At a later time, for example after the failed data link has been restored or an alternate link provisioned, a storage management device associated with volume 120a located at primary site 100 is configured to convey an indication of data blocks written to volume 120a subsequent to the data link failure (i.e., the data blocks subject to resynchronization) to a storage management device associated with a mirror volume 120b located at secondary site 101 (block 304). In various embodiments, either hosts 220, SAN switches 210, or both may serve as storage management devices.

Dependent upon the received indication of data blocks subject to resynchronization, the storage management device associated with volume 120b is configured to create a rollback snapshot of those data blocks prior to their resynchronization (block 306). As described above, in some embodiments a snapshot of all data blocks subject to resynchronization may be created prior to any resynchronization, while in other embodiments a snapshot copy of an individual block may be created at the time that individual block is resynchronized.

Subsequently, resynchronization of the indicated data blocks begins (block 308). For example, in one embodiment the indicated data blocks may be copied from volume 120a to volume 120b via ISL 230.

A failure may occur during resynchronization (block 310). If no failure occurs, resynchronization completes successfully and the consistency of volumes 120a and 120b is restored (block 312). If a failure does occur, volume 120b is restored to its original state prior to the beginning of resynchronization from the rollback snapshot (block 314).

Figure 4:
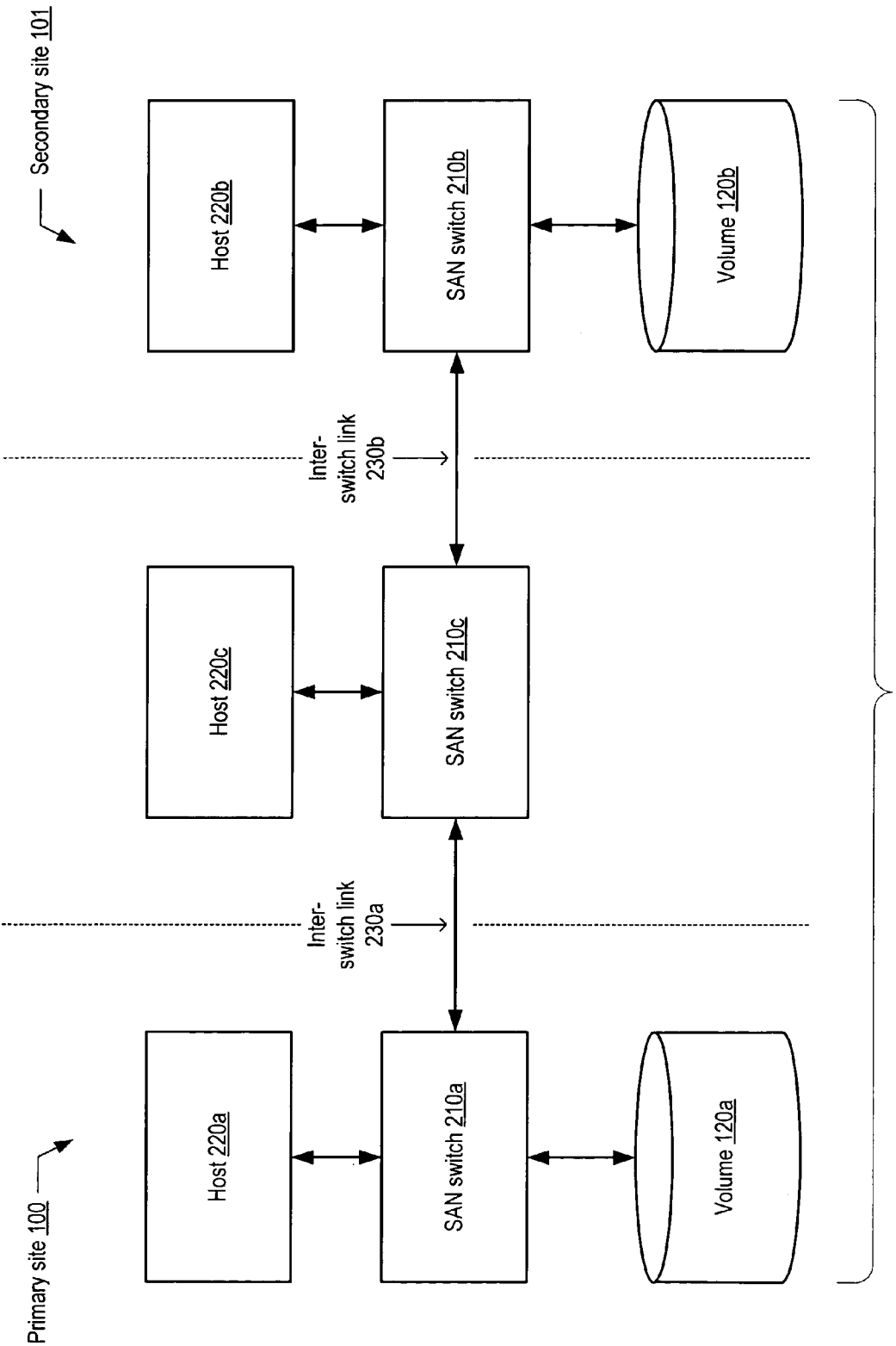
FIG. 4 is a block diagram illustrating another embodiment of a storage system.

More complex topologies of system 10 including pluralities of storage management devices and sites are possible and contemplated. In the embodiment illustrated in FIG. 4, an additional SAN switch 210c is interposed between primary site 100 and secondary site 101 of FIG. 2. SAN switch 210a at primary site 100 is coupled via ISL 230a to SAN switch 210c, which is in turn coupled via ISL 230b to SAN switch 210b at secondary site 101. In the illustrated embodiment, a host 220c is coupled to SAN switch 210c, and in some embodiments additional volumes 120 may be associated with SAN switch 210c.

In the illustrated embodiment, as in the embodiments of system 10 described above, volume 120b may be configured as a mirror of volume 120a. Block write traffic to volume 120a may correspondingly be conveyed to volume 120b via ISLs 230a-b as well as SAN switches 210a-c. A data link failure may occur due to failure of any of the components in the path from primary site 100 to secondary site 101, which may result in mirror inconsistency. Recovery from such a failure may occur by creating a rollback snapshot of data blocks of volume 120b subject to resynchronization prior to resynchronizing those blocks, as described above.

However, in the illustrated embodiment, several possible storage management devices may be capable of coordinating creation of the rollback snapshot. For example, host 220b or SAN switch 210b at secondary site 101 may be configured to create the rollback snapshot. Alternatively, host 220c, which in the illustrated embodiment is one data link removed from secondary site 101, may be configured to create the rollback snapshot by interacting with volume 120b via ISL 230b and SAN switch 210b. In other embodiments, it is contemplated that additional storage management devices may be capable of creating the rollback snapshot, and further that multiple different communication paths may exist between such additional devices, primary site 100 and secondary site 101. For example, in some embodiments parallel paths from primary site 100 to volume 120b may exist, or volume 120b may be located a number of data links or "hops" away from primary site 100.

Although some embodiments of system 10 may include multiple storage management devices capable of creating the rollback snapshot, the performance implications of selecting a given storage management device to create the snapshot may vary. For example, a storage management device such as host 220c or SAN switch 210c that is one or more data links removed from volume 120b may take more time to create the rollback snapshot, since the read and write traffic involved in snapshot creation may need to traverse the one or more intervening ISLs 230. In some embodiments, the bandwidth of ISL 230 may be limited such that data transfer through an ISL 230 may occur at a slower rate than data transfer local to a site (such as data transfer between host 220b and volume 120b). Even if the limited bandwidth of ISL 230 does not appreciably impact snapshot performance itself, in some instances the bandwidth consumed by snapshot creation may consume a substantial fraction of ISL 230 bandwidth, leaving less available for other types of data transfer and potentially degrading overall performance of system 10.

In one embodiment, a storage management device at primary site 100 (such as host 220a or SAN switch 210a) may be configured to select the storage management device to create the rollback snapshot from a plurality of storage management devices. Specifically, in one embodiment the device selection may occur dependent upon a cost associated with the selected device. For example, the cost of a host 220 or SAN switch 210 may depend on how many data links exist between that device and volume 120b, and in one embodiment, the storage management device selection may be dependent upon minimizing the number of data links between the selected device and volume 120b. In some embodiments, the cost of a given storage management device may be derived from more sophisticated parameters, such as the bandwidth or latency of a path from the given device to volume 120b. In some instances the cost may not be a simple function of the number of intervening data links (for example, if the bandwidth of the data links is not symmetric). In some embodiments, path dynamics (e.g., available bandwidth at a given point in time) may be taken into account in determining the cost of the given device.

Under some circumstances, one of host 220b or SAN switch 210b may be the lowest cost storage management device in the illustrated embodiment for creating the rollback snapshot, and may be accordingly selected to do so by host 220a or SAN switch 210a. However, in some instances, neither host 220b nor SAN switch 210b may be available to or capable of creating the rollback snapshot. For example, in one embodiment host 220b may fail or be omitted from system 10, and volume 120b may be coupled to an embodiment of SAN switch 210b that is not capable of creating a snapshot on its own. In such cases, another storage management device may be selected to create the rollback snapshot, where the cost of the selected device takes into account the availability and capability of the various storage management devices within system 10.

Figure 5:
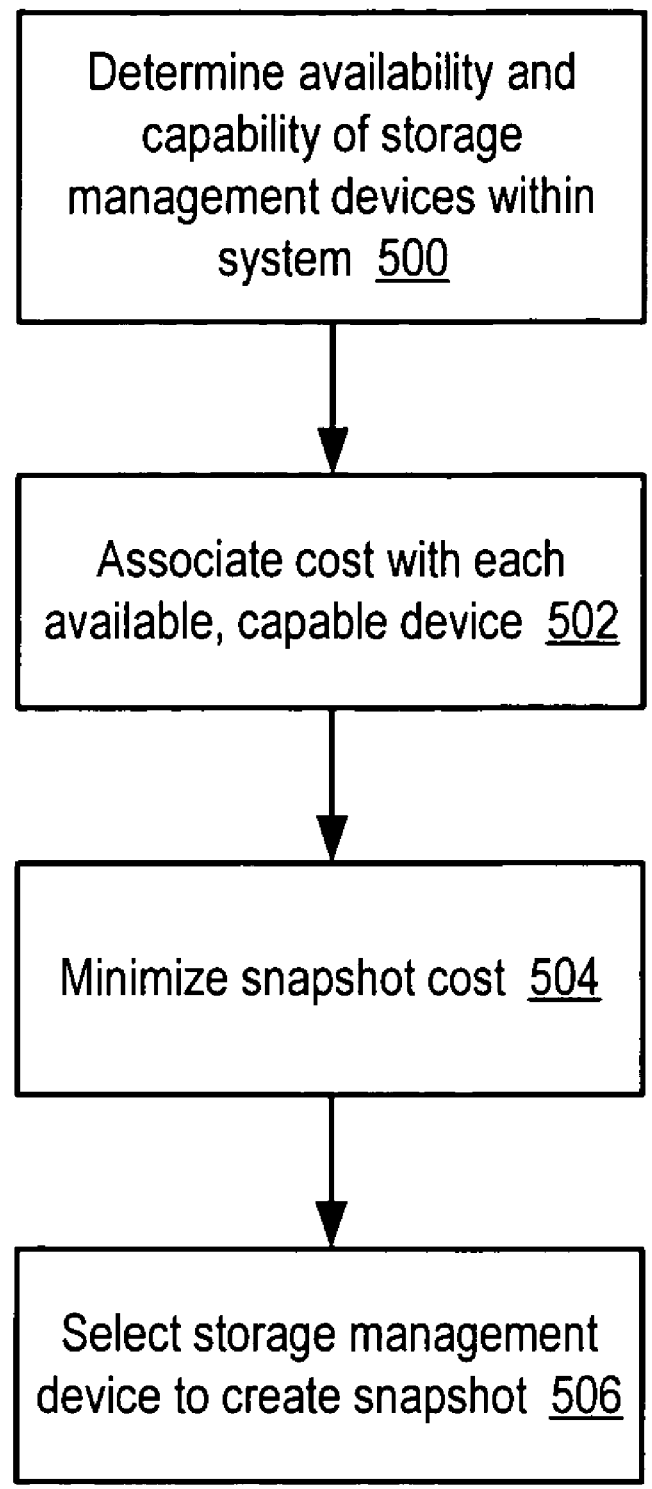
FIG. 5 is a flow diagram illustrating one embodiment of a method of selecting a storage management system for creating a snapshot.

One embodiment of a method of selecting a storage management device for creating a rollback snapshot from a plurality of storage management devices is illustrated in FIG. 5. Referring collectively to FIG. 1 through FIG. 5, operation begins in block 500 where the availability and capability of storage management devices within system 10 is determined. For example, in one embodiment host 220a or SAN switch 210a may probe other devices within system 10 to determine what devices are responsive and to determine the capabilities (e.g., for snapshot creation or other types of virtualization) of the responsive devices. Alternatively, host 220a or SAN switch 210a may consult data structures or other devices (e.g., resource tables or configuration servers) to ascertain device availability and capability.

Subsequently, a cost is associated with each of the available storage management devices capable of creating the rollback snapshot (block 502). For example, in one embodiment the number of data links between the candidate devices and volume 120b may be determined. As noted above, in some embodiments other factors such as available bandwidth or latency between the candidate devices and volume 120b may be taken into account in determining cost.

Once cost information is available, the cost of the rollback snapshot is minimized (block 504) and a storage management device is selected to create the snapshot (block 506). In some embodiments, cost minimization and selection may comprise simply choosing the storage management device having the lowest overall cost, while in other embodiments the minimization may include more sophisticated numerical optimization techniques. In some embodiments, the device with the absolute lowest cost may not be the one ultimately selected. For example, in one embodiment a storage management device with a cost slightly above the minimum cost may be selected to probabilistically avoid a situation in which multiple hosts 220 or SAN switches 210 may concurrently select the same storage management device to perform two different rollback snapshots. In such a situation, selecting a slightly suboptimal device might result in better system performance than selecting an apparently optimal device that may become oversubscribed.

It is contemplated that in some embodiments, the selection method illustrated in FIG. 5 may be combined with the block resynchronization method illustrated in FIG. 3. For example, in one embodiment the steps of the selection method may be performed following data link failure occurrence in block 300 of FIG. 3.

Figure 6:
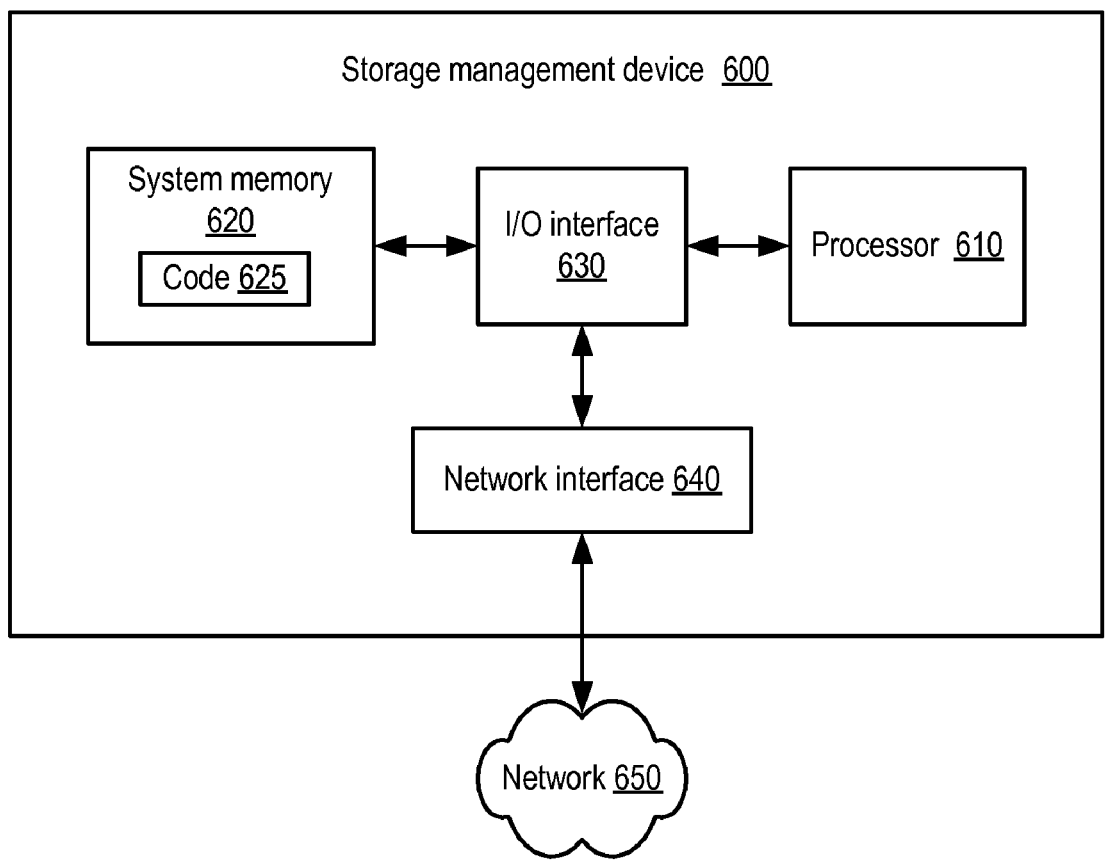
FIG. 6 is a block diagram illustrating one embodiment of a storage management device.

It is further contemplated that in some embodiments, any of the methods or techniques described above may be implemented as program instructions and data capable of being stored or conveyed via a computer-accessible medium. Such program instructions may be executed to perform a particular computational function, such as volume management tasks, storage virtualization tasks, operating system functionality, applications, and/or any suitable variants of the methods of data block resynchronization and storage management device selection described above. One embodiment of a storage management device including a computer-accessible medium is illustrated in FIG. 6. In the illustrated embodiment, storage management device 600 includes a processor 610 coupled to a system memory 620 via an input/output (I/O) interface 630. Storage management device 600 further includes a network interface 640 coupled to I/O interface 630 and to a network 650. In some embodiments, storage management device 600 may be illustrative of one or more of hosts 220 and/or SAN switches 210.

Processor 610 may be any suitable processor capable of executing instructions. For example, in various embodiments processor 610 may be a general-purpose or embedded processor implementing any of a variety of instruction set architectures (ISAs), such as the x86, POWERPC, SPARC, or MIPS ISAs, or any other suitable ISA.

System memory 620 may be configured to store instructions and data accessible by process 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 620 as code 625.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between storage management device 600 and other devices attached to a network. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 620 may be one embodiment of a computer-accessible medium configured to store program instructions and data as described above. However, in other embodiments, program instructions and/or data may be received, sent or stored upon different types of computer-accessible media; Generally speaking, a computer-accessible medium may include storage media or memory media such as magnetic or optical media, e.g., disk or CD-ROM coupled to device 600 via I/O interface 630. A computer-accessible medium may also include any volatile or non-volatile media such as RAM (e.g. SDRAM, DDR SDRAM, RDRAM, SRAM, etc.), ROM, etc, that may be included in some embodiments of device 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

Although the embodiments above have been described in considerable detail, numerous variations and modifications will become apparent to those skilled in the art once the above disclosure is fully appreciated. It is intended that the following claims be interpreted to embrace all such variations and modifications, and accordingly, the specifications and drawings are to be regarded in an illustrative rather than a restrictive sense.

What is claimed is:

1. A system, comprising:
   a first volume located at a primary site and associated with a first storage management device; and
   a second volume located at a secondary site and associated with a second storage management device, wherein said secondary site is coupled to said primary site via a data link, and wherein said second volume is configured as a mirror of said first volume;
   wherein in response to detecting a restoration of communication between said primary and said secondary sites following a failure of said data link, said first storage management device is configured to convey to said second storage management device an indication of a data block written to said first volume subsequent to said failure of said data link; and
   wherein dependent upon said indication, said second storage management device is configured to create a snapshot of said data block as stored on said second volume prior to resynchronization of said data block.

2. The system as recited in claim 1, wherein subsequent to creation of said snapshot, said first storage management device is configured to resynchronize said data block, and wherein resynchronizing said data block includes copying said data block from said first volume to said second volume.

3. The system as recited in claim 2, wherein in response to a resynchronization failure occurring while resynchronizing said data block, said second storage management device is configured to restore said data block according to said snapshot.

4. The system as recited in claim 1, wherein said second storage management device comprises a virtualization Storage Area Network (SAN) switch.

5. The system as recited in claim 1, wherein said second storage management device comprises a host system.

6. The system as recited in claim 1, wherein said first storage management device is further configured to select said second storage management device from a plurality of storage management devices.

7. The system as recited in claim 6, wherein selecting said second storage management device is dependent upon a cost of creating said snapshot from said second storage management device.

8. The system as recited in claim 6, wherein said second storage management device is located at a site other than said secondary site, and wherein selecting said second storage management device is dependent upon minimizing a number of data links between said second storage management device and said second volume.

9. A method, comprising:
   associating a second volume located at a secondary site with a second storage management device, wherein said secondary site is coupled to a primary site via a data link, and wherein said second volume is configured as a mirror of a first volume located at said primary site and associated with a first storage management device;
   in response to detecting a restoration of communication between said primary and said secondary sites following a failure of said data link, conveying to said second storage management device an indication of a data block written to said first volume subsequent to said failure of said data link; and
   dependent upon said indication, creating a snapshot of said data block as stored on said second volume prior to resynchronization of said data block.

10. The method as recited in claim 9, further comprising resynchronizing said data block subsequent to creating said snapshot, wherein resynchronizing said data block includes copying said data block from said first volume to said second volume.

11. The method as recited in claim 10, further comprising restoring said data block according to said snapshot in response to a resynchronization failure occurring while resynchronizing said data block.

12. The method as recited in claim 9, wherein said second storage management device comprises a virtualization Storage Area Network (SAN) switch.

13. The method as recited in claim 9, wherein said second storage management device comprises a host system.

14. The method as recited in claim 9, further comprising selecting said second storage management device from a plurality of storage management devices.

15. The method as recited in claim 14, wherein selecting said second storage management device is dependent upon a cost of creating said snapshot from said second storage management device.

16. The method as recited in claim 14, wherein said second storage management device is located at a site other than said secondary site, and wherein selecting said second storage management device is dependent upon minimizing a number of data links between said second storage management device and said second volume.

17. A computer-accessible storage medium, comprising program instructions, wherein the program instructions are computer-executable to:
   associate a second volume located at a secondary site with a second storage management device, wherein said secondary site is coupled to a primary site via a data link, and wherein said second volume is configured as a mirror of a first volume located at said primary site and associated with a first storage management device;

in response to detecting a restoration of communication between said primary and said secondary sites following a failure of said data link, convey to said second storage management device an indication of a data block written to said first volume subsequent to said failure of said data link; and dependent upon said indication, create a snapshot of said data block as stored on said second volume prior to resynchronization of said data block.

18. The computer-accessible storage medium as recited in claim 17, wherein the program instructions are further computer-executable to resynchronize said data block subsequent to creating said snapshot, wherein resynchronizing said data block includes copying said data block from said first volume to said second volume.

19. The computer-accessible storage medium as recited in claim 18, wherein the program instructions are further computer-executable to restore said data block according to said snapshot in response to a resynchronization failure occurring during resynchronizing said data block.

20. The computer-accessible storage medium as recited in claim 17, wherein said second storage management device comprises a virtualization Storage Area Network (SAN) switch.

21. The computer-accessible storage medium as recited in claim 17, wherein said second storage management device comprises a host system.

22. The computer-accessible storage medium as recited in claim 17, wherein the program instructions are further computer-executable to select said second storage management device from a plurality of storage management devices.

23. The computer-accessible storage medium as recited in claim 22, wherein selecting said second storage management device is dependent upon a cost of creating said snapshot from said second storage management device.

24. The computer-accessible storage medium as recited in claim 22, wherein said second storage management device is located at a site other than said secondary site, and wherein selecting said second storage management device is dependent upon minimizing a number of data links between said second storage management device and said second volume.

* * * * *